United States Patent [19]

Kahn et al.

[11] Patent Number: 5,071,091

[45] Date of Patent: Dec. 10, 1991

[54] LOAD LIMITING ENERGY ABSORBING LIGHTWEIGHT DEBRIS CATCHER

[75] Inventors: Jon B. Kahn, League City; William C. Schneider, Houston, both of Tex.

[73] Assignee: The United States of America as represented by the Administrator of the National Aeronautics and Space Administration, Washington, D.C.

[21] Appl. No.: 658,911

[22] Filed: Feb. 22, 1991

[51] Int. Cl.$^5$ ............................................. B64G 1/14
[52] U.S. Cl. ............................... 244/121; 244/129.4; 244/158 R
[58] Field of Search ................ 244/118.1, 121, 151 R, 244/117 R, 129.1, 129.4, 129.5, 158 R, 162; 150/52 H, 52 K; 102/303

[56] References Cited

U.S. PATENT DOCUMENTS

| | | |
|---|---|---|
| 547,172 | 10/1895 | Maguire . |
| 1,086,707 | 2/1914 | Hoagland . |
| 1,935,339 | 11/1933 | Tricau ............................ 244/151 R |
| 2,352,036 | 6/1944 | Tauty ............................. 244/151 R |
| 2,926,605 | 3/1960 | Hammel, Jr. et al. ................ 102/22 |
| 3,423,121 | 1/1969 | Lipkin ................................ 244/121 |
| 3,550,957 | 12/1970 | Radke et al. ....................... 188/371 |
| 3,897,919 | 8/1975 | Weingarten ...................... 244/118.1 |
| 4,073,452 | 2/1978 | Gosau ................................. 244/121 |
| 4,198,454 | 4/1980 | Norton ............................... 427/117 |
| 4,589,341 | 5/1986 | Clark et al. ......................... 102/303 |
| 4,728,059 | 3/1988 | Stephen et al. ..................... 244/121 |
| 4,887,780 | 12/1989 | Goodrich et al. ................ 244/137.2 |

Primary Examiner—Galen Barefoot
Attorney, Agent, or Firm—Russell E. Schlorff; Harold W. Adams; Edward K. Fein

[57] ABSTRACT

In the representative embodiment of the invention disclosed herein a load limiting, energy absorbing net is arranged to overlay a normally-covered vent opening in the rear bulkhead of the space orbiter vehicle. Spatially-disposed flexible retainer straps are extended from the net and respectively secured to bulkhead brackets spaced around the vent opening. The intermediate portions of the straps are doubled over and stitched together in a pattern enabling the doubled-over portions to progressively separate at a predicable load designed to be well below the tensile capability of the straps as the stitches are successively torn apart by the forces imposed on the retainer members whenever the cover plate is explosively separated from the bulkhead and propelled into the net. By arranging these stitches to be successively torn away at a load below the strap strength in response to forces acting on the retainers that are less than the combined strength of the retainers, this tearing action serves as a predictable compact energy absorber for safely halting the cover plate as the retainers are extended as the net is deployed. The invention further includes a block of an energy-absorbing material positioned in the net for receiving loose debris produced by the explosive release of the cover plate.

2 Claims, 3 Drawing Sheets

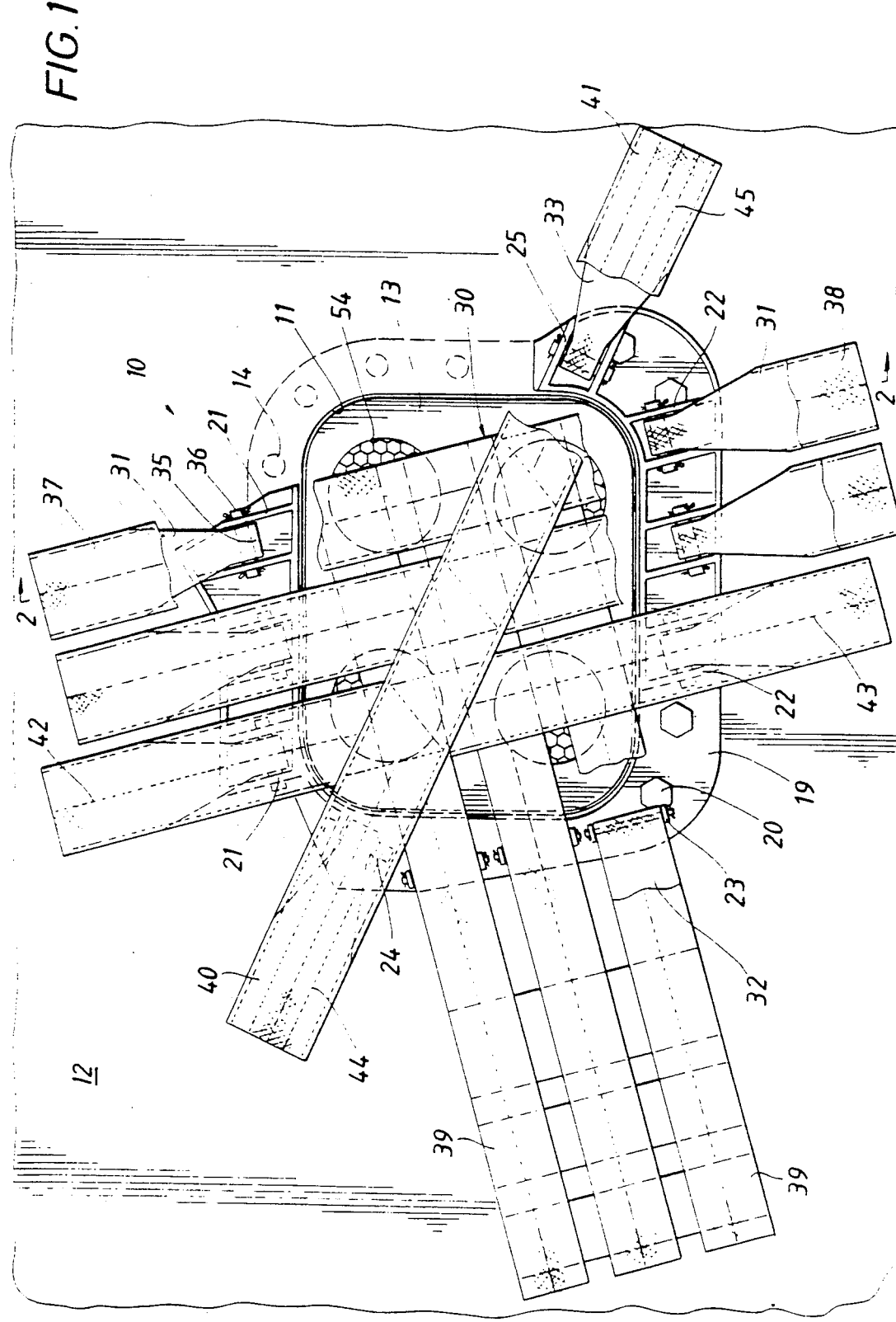

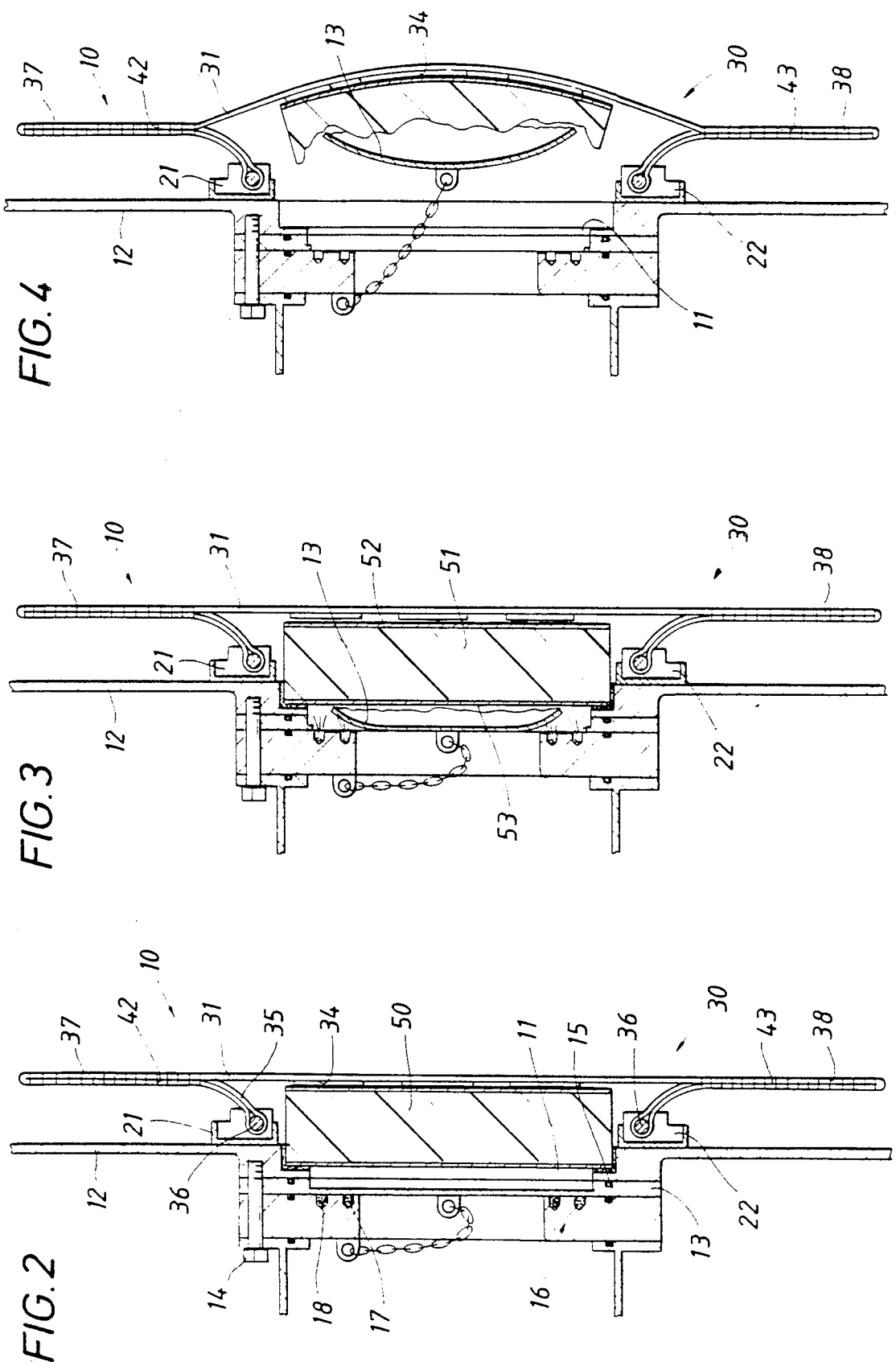

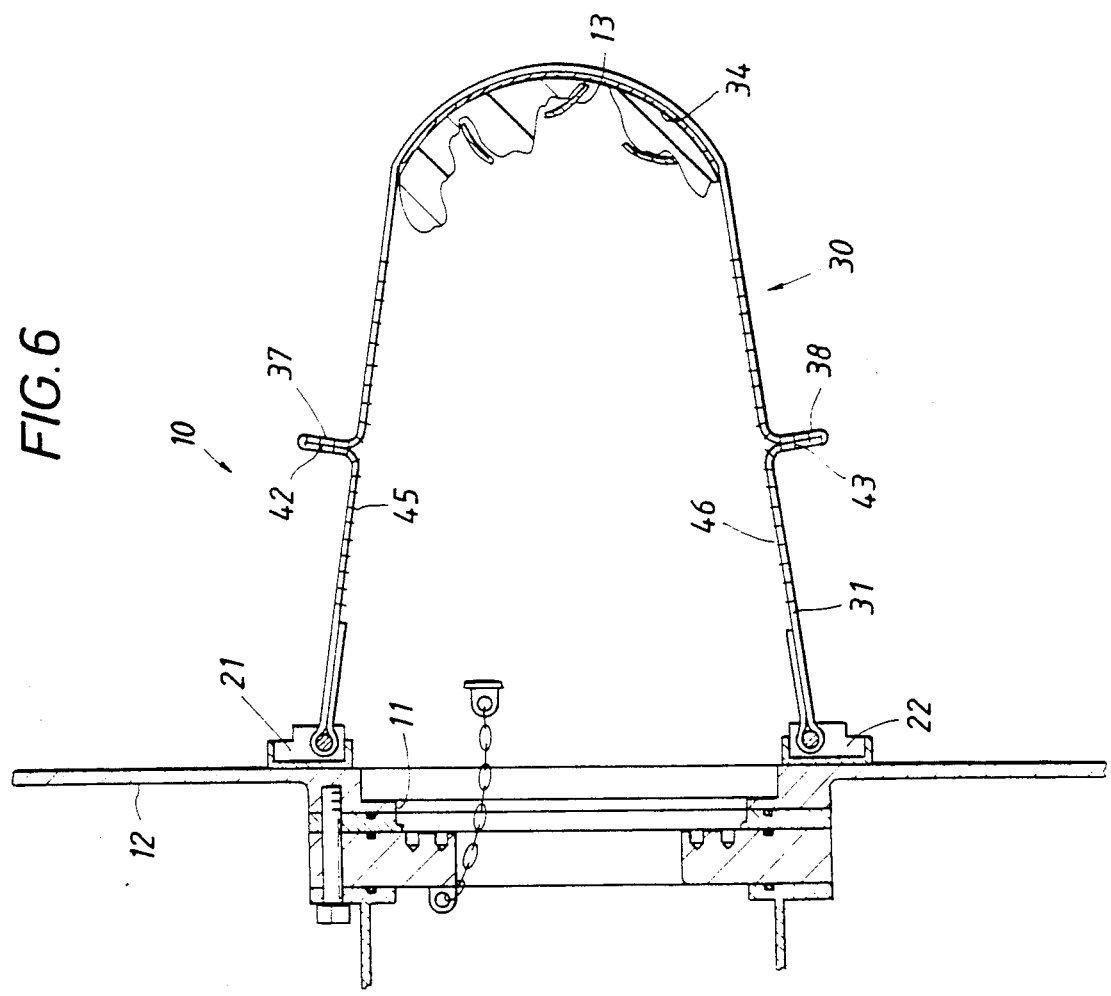
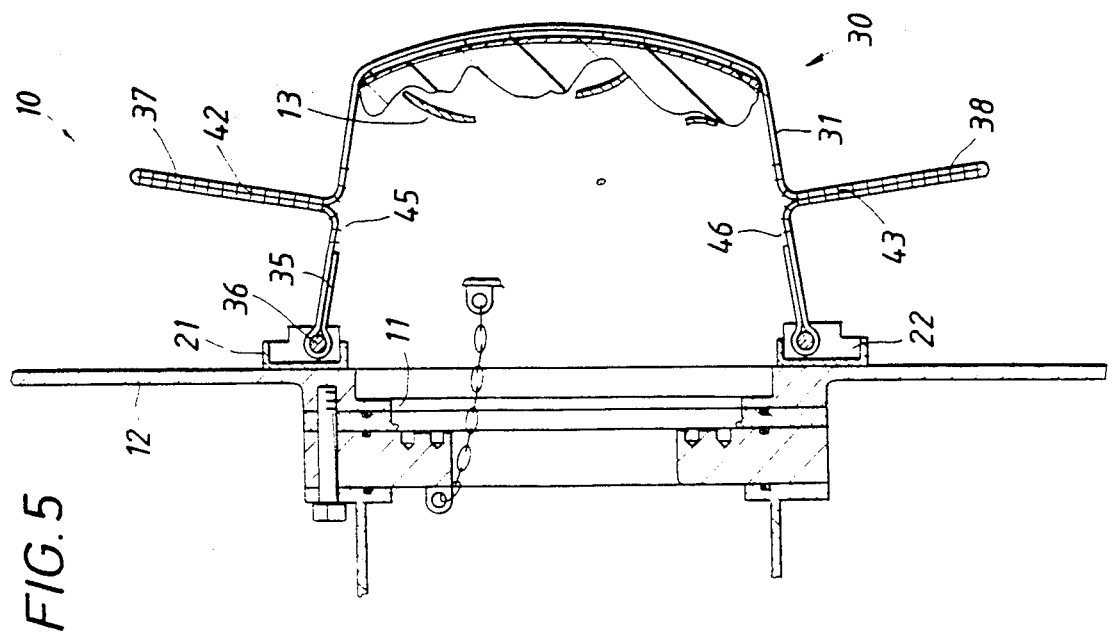

LOAD LIMITING ENERGY ABSORBING LIGHTWEIGHT DEBRIS CATCHER

ORIGIN OF THE INVENTION

The invention described herein was made by employees of the United States Government and may be manufactured and used by or for the Government of the United States without the payment of any royalties thereon or therefor.

BACKGROUND OF THE INVENTION

1. Field of the Invention

In designing the present space shuttle orbiter it is considered essential to provide means for quickly venting the air in the crew cabin on the orbiter should it become necessary for the crew to open an escape hatch in the lower compartment of the cabin and make an emergency evacuation if an abort situation occurs while the orbiter is at a relatively-low altitude. Those skilled in the art will, of course, recognize that unless the lower compartment of the crew cabin is quickly vented, there is a considerable risk of an implosion of the mid-deck of the orbiter vehicle before the crew members in the lower compartment can reach the escape hatch.

To deal with this potentially-dangerous situation, the orbiter is presently equipped with a vent opening in the lower portion of the rear bulkhead of the crew cabin. This vent opening is normally closed by a releasable cover plate that is disposed over the opening and sealingly engaged with the bulkhead for maintaining the pressure-tight integrity of the cabin. An explosive release assembly preferably comprising one or more linear shaped explosive charges is mounted on the forward face of the bulkhead with the linear shaped charges disposed against and directed at the marginal portion of the cover plate. The shaped charges are cooperatively arranged so as to be selectively actuated for quickly separating the cover plate from the bulkhead so as to rapidly exhaust the pressured air from the cabin compartment into the adjacent cargo bay just above the escape hatch is opened. In this manner, the crew can safely abandon the orbiter vehicle without risking an implosion of the intermediate deck in the cabin which might otherwise occur should the escape hatch be opened during the initial stages of the launch or when the orbiter is returning to earth.

Accordingly, the present invention pertains to new and improved apparatus for catching the cover plate when it is blown away from the vent opening of the orbiter as well as for trapping the various fragments caused by the actuation of the explosive release assembly and bringing these rapidly-moving objects to a halt in a relatively limited span of travel. In particular, the invention relates to new and improved compact energy-absorbing apparatus cooperatively arranged for reliably capturing the various elements of an explosively-actuated venting assembly that would be violently propelled therefrom upon the operation of the venting assembly. In this manner, the cover plate as well as broken elements and metal fragments will be halted before they can strike nearby fuel tanks in the cargo bay in the path of this rapidly-moving debris which might otherwise be exploded when impacted by this debris.

2. Background Art

At present it is proposed to construct the NASA space orbiter with an enclosed crew cabin which will be ordinarily maintained at a sufficient pressure that the crew can move freely around the cabin without wearing pressured suits. Nevertheless, provisions must be made to enable the crew to leave the cabin quickly and safely in the event of an emergency. One important aspect of such an emergency procedure is to provide an effective venting assembly for quickly exhausting the air in the crew cabin to prevent implosion of the cabin mid-deck when the crew escape hatch in the lower compartment is opened.

OBJECTS OF THE INVENTION

Accordingly, it is a principal object of the present invention to provide new and improved apparatus which is cooperatively arranged for reliably capturing the various elements of the explosive-actuated venting assembly and debris fragments which are blown away upon actuation of the venting assembly so that the shuttle crew can then safely abandon the Space Shuttle Orbiter vehicle.

It is a further object of the invention to provide a compact load limiting, lightweight, energy absorbing safety net cooperatively arranged for trapping the cover plate as well as catching any debris fragments created by the explosive release of the cover plate of the cabin-venting assembly so as to prevent any of these elements being propelled therefrom against fuel tanks or other hazardous components in the cargo bay which might be in the trajectory of the debris.

SUMMARY OF THE INVENTION

These and other objects of the present invention are attained by arranging a debris-catching assembly having a centralized net that is appropriately sized and shaped to at least substantially overlay the normally-covered vent opening in the rear bulkhead of the orbiter vehicle. In order for the debris-catching assembly to reliably catch the cover whenever it is blown free of the vent opening, spatially-disposed flexible retainer members are extended from the net and their ends are operatively arranged to be respectively secured to attachment brackets mounted on the bulkhead at spaced intervals around the vent opening. The intermediate portions of selected flexible retainer members are doubled over to bring the opposed surfaces of the retainers together; and these doubled-over portions are respectively stitched together in a stitching pattern enabling the doubled-over intermediate portions to be progressively separated as the stitches are successively torn apart by the by the impact of the cover plate into the net when the cover plate is explosively separated from the bulkhead. By arranging these stitches to be successively torn away in response to forces, acting on the retainers, that are less than their combined strap strength, this tearing action will serve as a predictable energy absorber for safely halting the plate by the time that the flexible retainers have been forcibly extended as the debris-catching assembly is being deployed.

The new and improved energy absorbing debris-catching assembly of the invention further includes a block of an energy-absorbing material which is positioned over at least the marginal portion of the cover plate and disposed between the net and the bulkhead for receiving any fragments or debris caused by the explosive release of the cover plate. By positioning the energy-absorbing block within the net, the block and the cover plate will be decelerated by the progressive tearing of the tear-away stitching so that when the cover plate is blown free of the vent opening neither the debris or fragments carried by the block nor the cover plate will be propelled beyond the confines of the net portion of the new and improved debris-catching assembly of the invention.

BRIEF DESCRIPTION OF THE DRAWINGS

The several features of the invention are set forth with particularity in the appended claims. The specific arrangement and practice of the invention, together with further objects and various advantages thereof, may best be understood by way of the following description of an exemplary apparatus incorporating the principles of the invention as illustrated in the accompanying drawings, in which:

FIG. 1 is a plan view of a preferred embodiment of the new and improved debris-catching assembly of the present invention depicting the exterior of the assembly as it will appear to an observer stationed in the cargo bay of the space orbiter and looking forwardly toward the outer face of the cover plate which normally covers the air vent opening in the bulkhead wall of the orbiter vehicle the crew cabin from the cargo bay;

FIGURE 2 is a cross-sectional end view taken along the lines "2—2" in FIG. 1 showing the cover plate and the fragment-capturing member mounted on the rearward or outward face of the cover plate as these elements will appear before the explosive charges included with an explosive release assembly have been detonated in order to release the cover plate from its normal position for closing the vent opening in the orbiter vehicle; and FIGS. 3–6 are somewhat-simplified end views of the debris-catching assembly of the present invention which successively show the controlled progressive deployment of the net and its flexible retainer members as these retainer members are being carried to their respective fully-extended positions in response to the explosive separation of the cover plate from its normal position blocking the air vent opening.

DETAILED DESCRIPTION OF THE PREFERRED EMBODIMENT

Turning now to FIG. 1, a preferred embodiment of the new and improved debris-catching assembly 10 of the invention is shown as the assembly will appear when it is installed over a rectangular air vent opening 11 situated at a convenient location in the lower portion of the rear bulkhead 12 of the Space Shuttle Orbiter cabin. Since neither the structural details of the orbiter vehicle itself nor the arrangement of the emergency escape system (such as the particular escape system described in U.S. Pat. No. 4,887,780) that is currently planned for the Space Shuttle Orbiter are needed to readily understand the present invention, the orbiter vehicle and escape system are not illustrated in the present drawings.

Accordingly, it is necessary only to point out that the rear bulkhead 12 is an upright, pressure-tight wall or transverse partition which divides the pressurized crew cabin at the forward end of the space orbiter from the unpressured cargo bay in the rearward portion of the orbiter vehicle. The debris-catching assembly 10 of the invention is mounted on the aft side of the bulkhead 12 which represents the forward wall of the cargo bay. In FIG. 1, the new and improved debris-catching assembly 10 is illustrated as it will appear to a viewer who is in the forward end of the cargo bay and is looking forwardly toward the crew cabin (not illustrated in the drawings) which is situated on the opposite or far side of the bulkhead 12 from the cargo bay. A typical flat cover plate 13 (which is best seen in FIG. 2) is positioned over the vent opening 11 and is releasably secured to the rear bulkhead 12 by a series of bolts (such as shown at 14 in FIG. 1) disposed at uniform intervals around the opening. A suitable sealant material or gasket (best seen at 15 in FIG. 2) is cooperatively arranged around the perimeter of the vent opening 11 for fluidly sealing the marginal portion of the flat cover plate 13 against the contiguous flat surface of the bulkhead 12 as the bolts 14 securing the cover plate to the bulkhead are tightened.

As best illustrated in FIG. 2, the debris-catching assembly 10 is cooperatively arranged for operating in conjunction with explosively-actuated release means such as a conventional shaped charge cutting assembly 16 which is preferably comprised of concentrically-arranged inner and outer linear shaped explosive charges 17 and 18 of a typical design which are cooperatively mounted on the bulkhead 12 so as to position those two shaped charges around the marginal edge portion of the cover plate 13 and facing the plate. Those skilled in the art will, of course, appreciate that although only a single linear shaped explosive charge will ordinarily be more than sufficient for reliably cutting through the cover plate 13, the inner and outer shaped charges 17 and 18 which are preferably employed with the explosive release assembly 16 will act as a redundant safety feature for making certain that the cover plate will be completely cut away from the vent opening 11 by one or both of the two linear charges when the explosive release assembly is actuated. Those who are skilled in the art will, of course, recognize how essential it is that the vent opening 11 be quickly cleared from any obstruction that might otherwise impede or block the rapid discharge of the air in the lower compartment of the crew cabin.

Accordingly, when the explosive release assembly 16 is selectively set off by a remotely-initiated detonator (not depicted in the drawings), the concentric perforating jets that are respectively produced by the shaped charges 17 and 18 will rapidly cut through the entire marginal edge portion of the cover plate 13. By cutting completely around the circumference of the cover plate 13, the plate will be immediately freed so that the pressured air rushing from the lower portion of the crew cabin into the cargo bay will be effective for quickly displacing the cover plate into the cargo bay at about the same time that the crew escape hatch (not illustrated in the drawings) in the upper portion of the crew cabin is being opened. In this manner, the rapid jettisoning of the cover plate 13 will be effective for bringing about a sufficiently-simultaneous pressure equalization in the upper and lower crew compartments to avoid the danger of an implosion of the intermediate deck into the lower compartment of the crew cabin that might otherwise occur should the vent opening 11 not be opened at about the same time as the escape hatch.

As illustrated in FIGS. 1 and 2, the new and improved debris-catching assembly 10 of the invention further includes a metal frame 19 which is secured to the outward face of the bulkhead 12 and disposed around at least a substantial portion of the perimeter of the vent opening 11. Although it would, of course, be preferable for the frame to extend completely around the opening 11, in designing the debris-catching assembly 10, it was considered necessary to form the frame 19 in its depicted C-shaped configuration so that the frame extends only partway around the full perimeter of the vent opening in order to avoid nearby structural members and equipment (not shown in the drawings) lying immediately adjacent to the right of the vent opening. It will, of course, be understood by those skilled in the art that in order to compensate for the strength that would ordinarily be provided by its omitted portion, the C-shaped frame 19 is designed to have sufficient strength for carrying the anticipated impact loads imposed on the debris-catching assembly 10 upon actuation of the explosive release assembly 16. The frame 19 is further configured for providing a planar bottom surface with sufficient area to enable the frame to be securely bonded to the outward face of the bulkhead 12 by means of a typical epoxy adhesive. As an added measure of safety, a plurality of spatially-disposed bolts, as at 20, may also be arranged for mounting the frame 19 to the bulkhead 12 so as to provide a reliable structural tie between the bulkhead and the new and improved debris-catching assembly 10 of the present invention.

In the preferred arrangement of the debris-catching assembly 10, a plurality of upstanding clevis members or brackets are spatially disposed around the frame 19, with a first set of these bifurcated attachment brackets, as at 21, being arranged at spaced intervals along the upper portion of the frame and a second set of these attachment brackets, as at 22, being similarly arranged along the lower portion of the frame so as to be substantially diametrically opposite to the upper attachment brackets. Those skilled in the art will realize, of course, that if there were sufficient free space around the vent opening 11 so that the frame 19 could completely encircle the vent opening, various symmetrical bracket arrangements could be devised without departing from the scope of the invention. Nevertheless, since the structural members and equipment (not depicted) in the cargo bay just to the right of the vent opening 11 significantly restrict the placement of the attachment brackets, these first and second brackets 21 and 22 are respectively aligned along a slightly-tilted axis so as to allow the debris-catching assembly 10 of the invention to function independently of the otherwise-interfering nearby equipment and structural members of the orbiter that is located adjacent to the vent opening 11. A third set of attachment brackets, as at 23, is also cooperatively located along the left-hand side of the frame 19 approximately midway between the upper and lower brackets 21 and 22. Since the C-shaped frame 19 does not completely encircle the vent opening 11, it is obvious that there can be no brackets to the right of the vent opening. Accordingly, to compensate for this, as will be subsequently explained it is preferred to provide a fourth attachment bracket 24 which is arranged on the frame 19 between the first and third sets of the attachment brackets 21 and 22 as well as a fifth attachment bracket 25 that is located diametrically opposite the fourth attachment bracket just beyond the right-hand end of the lower set of attachment brackets 22.

In the preferred embodiment of the new and improved debris-catching assembly 10 of the present invention, a centralized net assembly 30 is formed of a plurality of flexible members such as flat, webbed straps, as at 31-33, fabricated of a strong plastic material such as Kevlar. These several straps 31-33 are cooperatively arranged in relation to one another so that as best seen in FIG. 2 their mid-portions will overlap one another for defining a central net portion 34 and the respective terminal portions of these straps will be extended outwardly in different directions from this central net portion to serve as flexible retainer members. In the preferred manner of coupling the net assembly 30 to the frame 19, means are provided such as doubling back the outermost end portions of each of these several straps 31-33 and stoutly stitching each of these doubled-back end portions together for forming transverse end loops, as depicted generally at 35, at the end of each strap. The end loops 35 are respectively coupled to the frame 19 by means such as stout transverse pins, as at 36, which are passed through these end loops and have their respective ends fitted in aligned holes (not illustrated in the drawings) provided in the paralleled upright members or spaced arms of the several attachment brackets 21-25 on the frame 19.

The end loops 35 on the opposite ends of this first set of straps 31 are respectively coupled to the upper and lower sets of the attachment brackets 21 and 22. It will, of course, be noted from FIG. 1 that the relative placement of these upper and lower brackets 21 and 22 on the frame 19 locates the first set of flexible straps 31 of the net assembly 30 in an upright but slightly tilted position with respect to the cover plate 13 and the vent opening 11. It will also be noted that this first set of straps 31 is arranged so as to position the central net portion 34 directly over the cover plate 13 as well as to leave intermediate portions, as at 37 and 38, of these straps which are substantially equal in length and extend outwardly in opposite directions from the upper and lower borders of the central net portion.

As also illustrated in FIG. 1, the second set of straps 32 of the net assembly 30 is laid at substantially right angles in relation to the first set of straps 31. Since there are no attachment brackets on what would otherwise be the upper right-hand portion of the frame 19, these second straps 32 instead have end portions that are respectively overlapped with the undersides of the mid-portions of the first set of straps 31; and these overlapping strap portions are stoutly stitched together so as to further strengthen and close up gaps in the central net portion 34 of the net assembly 30. The second straps 32 are, therefore, cooperatively arranged so that each strap will have only a single intermediate portion, as at 39, which is substantially equal in length to the respective intermediate portions, as at 37 and 38, of the first set of straps 31. The end loops, as at 35, that are provided on the free ends of each of the several second straps 32 are similarly coupled to the third set of the attachment brackets 23. It will, of course, be realized from FIG. 1 that the orientation of this third set of brackets 23 serves to locate the central axis of the second set of straps 32 in a substantially horizontal but slightly tilted position with respect to the vent opening 11 and the cover plate 13. Hereagain, it will be appreciated that this second set of straps 32 is also cooperatively arranged so as to position the central net portion 34 directly over the opening 11 and the cover plate 13.

Since there are no brackets on the opposite side of the central net portion 34 which would be diametrically aligned with the third set of brackets 23, the second set of straps 32 can not be extended over the central net portion and coupled to the bulkhead 12. Thus, in the preferred embodiment of the net assembly 30, the single third strap 33 is laid diagonally across the first and second sets of straps 31 and 3 and is coupled at its opposite end loops 35 to the attachment brackets 24 and 25 respectively located in the upper left-hand and lower right-hand corners of the C-shaped frame 19. The midportion of the third strap 33 is overlapped in relation to the first and second straps 31 and 32; and the straps are stoutly stitched to one another for strengthening or stiffening of the central net portion 34. It will be appreciated that since these second straps 32 do not extend beyond the right-hand side of the central net portion 34, the third strap 33 may also be effective for preventing the central net portion from tilting from its preferred parallel orientation relative to the bulkhead 12 should debris displaced from the cover plate 13 and the frame 19 strike only the right-hand side of the central net portion. It must be appreciated that even though the frame 19 does not completely encircle the vent opening 11, experimental tests have demonstrated that the illustrated placement of the several brackets 21-25 is particularly effective for maintaining the centralized net assembly 30 in alignment with the opening as the net assembly is being deployed.

It will be understood from FIGS. 1 and 2 that the respective overall lengths of the straps 31-33 are selected to provide intermediate portions of considerable and equal lengths which may be doubled back when the net assembly 30 is disposed in its illustrated collapsed position lying across the vent opening 11 and the cover plate 13. For example, the first and third straps 31 and 33 are respectively arranged for defining doubled-back intermediate portions, as at 37 and 38 and at 40 and 41, of substantial and equal lengths which are located on opposite sides of the central net portion 34. In a similar fashion, each of the second retainer straps 32 has a single doubled-back intermediate portion, as at 39, of the same length as each of the intermediate portions 37, 38, 40 and 41 which is disposed on only the left-hand side of the central net portion 34. As will be explained in more detail, one or more of these several doubled-back intermediate portions 37-41 are respectively stitched, as at 42-45, to releasably secure the stitched portions in a facing relationship as well as selectively control the separation of these doubled-back portions when the straps 31-33 are extended. As illustrated in FIG. 1, the several stitches 42-45 are preferably made along a longitudinal sewing axis that is substantially parallel to the longitudinal axis of the respective strap 31-33. It will be appreciated that as the doubled-back portions 37-41 of the straps 31-33 are being progressively separated, these several break-away stitches 42-46 will be serially broken without interruption. On the other hand, if the doubled-back strap portions 37-41 were instead stitched together by parallel rows of transverse stitches running from edge to edge of the several straps 31-33, the resulting tearing action would be a spaced series of momentary disruptions. In either case, the tearing action of these break-away stitches will serve to selectively retard the forward travel of the cover plate 13 along its trajectory.

In the practice of the invention, the doubled-back intermediate portions 37-41 of the several straps 31-33 are arranged to be of substantially-equal lengths. Although the overall length of the straps 31-33 may be sufficient that they can be doubled back or folded more than once, it is preferred that the several intermediate portions, as at 37-41, be doubled back only once so as to respectively form a single elongated. The maximum extent of the outward displacement or deployment of the central net portion 34 will, of course, be established by the respective overall lengths of the straps 31-33.

Thus, as will be subsequently described in greater detail by reference to FIGS. 3-6, when the explosive release assembly 16 is selectively actuated, the central net portion 34 will remain in a generally-vertical plane which is more or less parallel to the bulkhead 12 when the centralized net assembly 30 is being forcibly driven outwardly along a trajectory that is perpendicular to the bulkhead. As will be subsequently described, the impact of the cover plate 13 is effective for carrying the net assembly 30 to its partially-deployed position as the cover plate is propelled into the central net portion. It will be appreciated, of course, that the stitches, as at 42 and 43, securing the intermediate doubled-over portions 37 and 38 of the straps 31 will be successively torn away as the cover plate 13 is being explosively driven into the central net portion 34. Thus, the successive tearing away of the several stitches 42-45 holding the several intermediate portions 37-41 of the straps 31-33 will controllably decelerate the explosively-propelled cover plate 13 producing the energy absorbing, load limiting capability as well as retaining the debris from the frame 19 which is produced upon actuation of the release assembly 16.

Those skilled in the art will recognize that the forces to be controlled by the break-away stitches 42-46 can be readily calculated by the equation: $E = \frac{1}{2}mV^2$, where E is expressed in foot-pounds, m is the estimated total mass of the cover plate 13 and the debris produced by the detonation of the shaped charges 17 and 18, and V is the estimated velocity of the cover plate and debris. On the other hand, the strength of each of the several break-away stitches 42-46 can be determined empirically so that an overall restraining force can be determined by multiplying the number of straps 31-33 that will have doubled-back intermediate portions, as at 37-41, that are stitched together. For example, if only four straps are stitched together, this combined restraining force will be the product of four times the strength of each set of the several break-away stitches 42-46. Thus, by dividing the impact load (in foot-pounds) that must be absorbed by the strength of the break-away stitches (in pounds of force), the resulting answer (in feet) will be the minimum distance that these straps must respectively extend in order to completely decelerate the cover plate 13 and bring it to a complete halt by the time that the centralized net assembly 30 is fully deployed.

As described above, upon actuation of the explosive release assembly 16, a small amount of debris will be cut away from the contiguous marginal portions of the frame 19 and the cover 13 by the perforating jets produced by the shaped charges 17 and 18. Although the overall mass of the debris that is cut away from the frame 19 and the cover plate 13 is expected to be relatively small in comparison to the mass of the cover plate itself, this debris may well include one or more fragments having sufficient velocity and mass to penetrate a nearby fuel tank in the cargo bay of the orbiter vehicle. It is also conceivable that the minute high-speed particles which respectively comprise the perforating jets produced by the shaped charges 17 and 18 might also damage a nearby fuel tank.

Accordingly, to make sure that such damage will not occur when the explosive release assembly 16 is actuated, the new and improved debris-catching assembly 10 of the invention further includes means such as a block 50 of an energy-absorbing material which is mounted over at least the marginal portion of the cover plate 13 for capturing loose debris which may be caused by the explosive release of the cover plate. By positioning the energy-absorbing block 50 within the centralized net assembly 30 so as to intersect the trajectory of the cover plate 13, when the plate is blown free of the vent opening 11, the block and the cover plate will be decelerated by the progressive tearing of the tear-away stitching as at 42-46. In this manner, neither the debris fragments captured by the energy-absorbing block 50 nor the cover plate 13 trapped in the central net portion 34 will be propelled beyond the confines of the centralized net assembly 30 of the present invention.

In the preferred embodiment of the debris-catching assembly 10 of the invention, the energy-absorbing block 50 is preferably formed of a hex-cell honeycomb 51 of aluminum which is bonded between two parallel sheets 52 and 53 of aluminum which respectively define the forward and rearward faces of the block. To retain the energy-absorbing block 50 in its initial position illustrated in FIGS. 1 and 2, the rearward aluminum sheet 53 is bonded to the bulkhead 12 by means such as a suitable epoxy that is disposed around the marginal portion of the bulkhead around the vent opening 11. It is, of course, unlikely that the actuation of the explosive release assembly 16 will fail to dislodge the energy-absorbing block 50 when the vent cover plate 13 is jettisoned. Nevertheless, in the unlikely event that the block 50 is not completely displaced from its normal position over the vent opening 11 so as to even partially obstruct the passage of air from the crew cabin, it is considered advisable to provide one or more relief openings, as at 54, in the forward and rearward aluminum sheets 52 and 53 which, along with the multiple labyrinth openings of the honeycomb material itself, serve to define a large number of alternative escape passages through which the air being exhausted from the cabin may readily pass.

Turning now to FIGS. 3-6, successive views are shown of the debris-catching assembly 10 to illustrate the controlled progressive deployment of the net 30 and its retainer straps 31-33 as these members are being carried to their respective fully-extended positions in response to the explosive displacement of the cover plate 13 from its normal position over the air vent opening 11. In FIG. 3, the debris-catching assembly 10 is depicted in a somewhat-schematic manner as it will appear just as the shaped charges 17 and 18 are detonated. As has been described, the upper and lower intermediate portions 37 and 38 of the straps 31 are stitched together by their respective break-away stitches 42 and 43.

At the particular moment schematically illustrated in FIG. 4, the shaped charges 17 and 18 have just cut through the marginal portion of the cover plate 13. The release of the cover plate 13 has allowed the air in the crew cabin to begin rushing through the now-opened vent opening 11 (from left to right in FIG. 4) for forcibly displacing the freed portion of the cover plate away from the bulkhead 12. It should be noted that although the straps 31 have been moved out of their normal upright positions (as previously represented in FIG. 3) to their extended positions as depicted in FIG. 4, the tear-away stitches 42 and 43 are still intact even though the forces acting on the cover plate 13 have carried the central net portion 34 a short distance into the cargo bay. The energy-absorbing block 50 will, of course, be substantially distorted and deformed by the explosive forces of the now-detonated shaped charges (not shown in FIG. 4) and will be driven into the central net portion 34. As previously described, it will be recognized that the energy-absorbing block 50 will be carrying whatever fragments or pieces of loosened debris from the cover plate 13 and the frame 19 that were driven into the block upon the detonation of the shaped charges 17 and 18 (not depicted in FIG. 4).

In the subsequent view, FIG. 5, the now-jettisoned cover plate 13 is shown as having carried the central net portion 34 far enough into the cargo bay that the forward extension of the doubled-over intermediate strap portions 37 and 38 can not continue unless the tear-away stitches 42 and 43 holding the strap portions together are broken. Thus, as depicted at 45 and 46, the first of the tear-away stitches 42 and 43 which are to be broken are shown as they might appear immediately after they have been broken by the forcible outward movement of the cover plate 13 into the central net portion 34 caused by the rapid discharge of air into the cargo bay. In keeping with the previous discussion as to the major function of the tear-away stitches, as at 42 and 43, it will be appreciated that there will be a moderate dissipation of the energy or forces imposed against the central net portion 34 by the impact of the rapidly-moving cover plate 13 as these first stitches are being torn away from the upper and lower folded-over strap portions 37 and 38. In a similar fashion, if a particular design configuration require the stitching together of the doubled-over intermediate portions of the third strap 33 separately or in conjunction with either or both of the first and second straps 31 and 32, those stitches (not illustrated in the drawings) will also be serving to retard the forward progress of the cover plate 13 as those stitches are progressively broken.

Turning now to FIG. 6, the new and improved debris-catching assembly 10 is depicted as it may appear at the moment when the energy of the rapidly-moving cover plate 13 has finally been completely dissipated by the progressive tearing of the stitches 44 and 45. It will be recognized, of course, that the unbroken stitches, as at 42 and 43, are shown as still being intact and thus are respectively retaining the outermost end portions of the upper and lower doubled-over intermediate portions 37 and 38 of the straps 31. Accordingly, by virtue of these still-intact portions of the stitches 37 and 38, the debris-catching assembly 10 would have been capable of halting the jettisoned cover plate 13 had its total energy or kinetic force been somewhat greater. This "reserve" capacity will, of course, be best established in the initial planning stages preparing the debris-catching assembly 10 for functioning in a particular mission.

Accordingly, it will be understood that the new and improved debris-catcher of the present invention provides apparatus which may be readily installed over an object which is to be exploded or rapidly released. By using the principles of the present invention, the centralized net assembly 30 and the energy-absorbing block 50 will be effective for respectively capturing the cover plate 13 as well as trapping the fragments and debris loosened by the immediately-prior detonation of one or more of the shaped charges 17 and 18. By virtue of the energy-absorbing properties of the block 50, fragments which might otherwise be explosively propelled against nearby equipment in the cargo bay of the space shuttle orbiter will be safely captured. Likewise, by virtue of the progressive tearing away of the several stitches holding the flexible retainers in a doubled-over relationship, as these stitches are broken the explosive energy will be selectively controlled until finally dissipated.

While only one particular embodiment of the present invention has been described above and illustrated in the drawings, it is readily apparent that modifications and changes may be made without departing from the invention in its broader aspects; and, therefore, the aim in the claims appended hereto is to cover those modifications and changes which fall within the true spirit and scope of the invention.

What is claimed is:

1. Apparatus to restrain a releasable cover plate sealing a nominally-covered vent opening in a bulkhead between the crew compartment and cargo bay of a space shuttle orbiter in the event of an explosive release to open the vent, said apparatus comprising:

a plurality of first and second flat webbed load limiting, energy absorbing straps arranged substantially perpendicular to one another with portions thereof overlapping, defining a centralized net overlying the cover plate with the terminal portions of said first and second straps respectively extending outwardly from opposite sides of said net;

means for securing the free ends of said first and second straps to spatially-disposed locations on the bulkhead about the vent opening;

a block of energy-absorbing material positioned between the net and cover plate for receiving the initial load of the cover plate and entraining any loose debris produced by the explosive release of the covered plate; and means for progressively halting the cover plate forcibly propelled along a selected trajectory into said net including a plurality of stitched threads releasably securing a doubled-over terminal portion of said first and second straps for controlling the progressive extension of said straps as said stitched threads are successively torn apart by the impact forces imposed on said first and second straps by the forceful propulsion of the cover plate into said centralized net by a force less than the load carrying capability of energy absorbing straps whereby the cover plate and debris will be halted before causing catastrophic damage in the cargo bay.

2. The apparatus in claim 1 wherein the block is provided with at least one relief opening to define an alternate escape passage through which the air being exhausted from the crew compartment may readily pass.

* * * * *